(12) United States Patent
France

(10) Patent No.: US 6,286,288 B1
(45) Date of Patent: Sep. 11, 2001

(54) INTEGRATED MULTIPANE WINDOW UNIT AND SASH ASSEMBLY AND METHOD FOR MANUFACTURING THE SAME

(75) Inventor: John France, Cuyahoga Falls, OH (US)

(73) Assignee: Vertical Ventures V-5, LLC, Southport, CT (US)

( * ) Notice: Subject to any disclaimer, the term of this patent is extended or adjusted under 35 U.S.C. 154(b) by 0 days.

(21) Appl. No.: 09/307,825

(22) Filed: May 7, 1999

Related U.S. Application Data

(63) Continuation-in-part of application No. 08/935,924, filed on Sep. 23, 1997, now abandoned.
(60) Provisional application No. 60/032,776, filed on Dec. 5, 1996.

(51) Int. Cl.$^7$ ................. E06B 3/24; E06B 3/64; E06B 3/66; E06B 3/663
(52) U.S. Cl. .......... 52/786.1; 52/786.13; 52/788.1; 52/204.6; 52/204.62; 428/34
(58) Field of Search ............ 52/786.1, 786.13, 52/788.1, 204.62, 204.6, 204.7, 204.53, 204.593, 204.597, 204.69, 204.71; 428/34

(56) References Cited

U.S. PATENT DOCUMENTS

| | | | | |
|---|---|---|---|---|
| 309,636 | * | 12/1884 | Mann | 52/204.593 |
| 2,993,242 | * | 7/1961 | Leisibach | 52/204.593 |
| 3,008,196 | * | 11/1961 | Springer et al. | 52/786.11 |

(List continued on next page.)

FOREIGN PATENT DOCUMENTS

| | | | | |
|---|---|---|---|---|
| 728445 | | 2/1966 | (CA) . | |
| 209284 | * | 6/1940 | (CH) | 52/786.1 |
| 433675 | | 9/1967 | (CH) . | |
| L 17545 | * | 12/1956 | (DE) | 52/786.1 |
| 1123457 | * | 2/1962 | (DE) | 52/786.1 |
| 1915245 | | 10/1970 | (DE) . | |
| 2041038 | * | 2/1971 | (DE) | 52/786.1 |
| 2449726 | | 4/1976 | (DE) . | |
| 2457472 | | 6/1976 | (DE) . | |
| 2614049 | | 6/1976 | (DE) . | |
| 2607287 | | 8/1977 | (DE) . | |
| 2723283 | * | 4/1979 | (DE) | 52/786.1 |
| 3825580 | * | 2/1990 | (DE) | 52/786.1 |
| 65510 | * | 11/1982 | (EP) | 52/786.13 |
| 381646 | * | 8/1990 | (EP) | 52/786.1 |
| 1079389 | | 11/1954 | (FR) . | |
| 60912 | * | 2/1955 | (FR) | 52/786.1 |
| 1429980 | * | 1/1966 | (FR) | 52/786.1 |
| 2420014 | | 11/1979 | (FR) . | |
| 2501773 | * | 9/1982 | (FR) | 52/786.1 |
| 2518158 | * | 6/1983 | (FR) | 52/786.1 |
| 2612244 | * | 9/1988 | (FR) | 52/786.1 |
| 2624545 | * | 6/1989 | (FR) | 52/786.1 |
| 2648178 | * | 12/1990 | (FR) | 52/786.1 |
| 2708030 | * | 1/1995 | (FR) | 52/786.1 |
| 234987 | | 6/1925 | (GB) . | |
| 949997 | | 2/1964 | (GB) . | |
| 1535173 | * | 12/1978 | (GB) | 52/786.1 |
| 2077834 | * | 12/1981 | (GB) | 52/786.1 |
| 2254358 | * | 10/1992 | (GB) | 52/786.1 |
| 628775 | * | 11/1961 | (IT) | 52/786.1 |
| 726293 | * | 4/1980 | (SU) | 52/786.13 |

*Primary Examiner*—Laura A. Callo
(74) *Attorney, Agent, or Firm*—Barry R. Lipsitz

(57) ABSTRACT

A multipane window unit is provided in which a sash frame is formed having an integral spacing structure upon which glazing panes are directly affixed. The integrally spacing structure is formed integral with the sash frame at vertical internal glazing surfaces. Adhesive can be affixed to the vertical internal glazing surfaces the glazing panes. In this manner, a rigid, structural sash frame can be formed prior to attachment of the glazing panes, thereby eliminating the need for using separately manufactured insulating glass units while obtaining similar and improved benefits.

20 Claims, 5 Drawing Sheets

U.S. PATENT DOCUMENTS

| | | | |
|---|---|---|---|
| 3,030,673 | * 4/1962 | London | 52/204.593 X |
| 3,054,153 | * 9/1962 | Partsch | 52/786.1 |
| 3,775,914 | 12/1973 | Patil . | |
| 3,791,910 | * 2/1974 | Bowser | 428/34 |
| 3,872,198 | 3/1975 | Britton . | |
| 3,919,023 | 11/1975 | Bowser et al. . | |
| 3,990,196 | * 11/1976 | Eddins et al. | 52/204.62 X |
| 4,015,394 | * 4/1977 | Kessler | 52/786.13 X |
| 4,055,031 | 10/1977 | Okawa et al. . | |
| 4,109,432 | 8/1978 | Pilz . | |
| 4,149,348 | * 4/1979 | Pyzewski | 428/34 X |
| 4,368,226 | 1/1983 | Mucaria . | |
| 4,407,105 | 10/1983 | Frank . | |
| 4,454,703 | * 6/1984 | Sitzler et al. | 52/786.13 X |
| 4,479,988 | 10/1984 | Dawson . | |
| 4,652,472 | * 3/1987 | Davies | 428/34 |
| 4,753,056 | * 6/1988 | Pacca | 52/204.593 |
| 4,850,175 | * 7/1989 | Berdan | 52/786.13 |
| 4,928,448 | * 5/1990 | Phillip | 52/786.13 X |
| 4,994,309 | 2/1991 | Reichert et al. . | |
| 5,061,531 | * 10/1991 | Catalano | 428/34 |
| 5,107,655 | 4/1992 | Lindgren . | |
| 5,251,417 | * 10/1993 | Yates, Jr. | 52/786.13 X |
| 5,295,292 | 3/1994 | Leopold . | |
| 5,313,761 | * 5/1994 | Leopold | 52/786.13 X |
| 5,364,921 | 11/1994 | Gray . | |
| 5,437,902 | * 8/1995 | Itoh et al. | 52/786.13 X |
| 5,568,714 | 10/1996 | Peterson . | |
| 5,640,828 | * 6/1997 | Reeves et al. | 52/786.13 X |
| 5,653,073 | * 8/1997 | Palmer | 52/204.593 |
| 5,665,823 | 9/1997 | Saxena et al. . | |
| 6,055,783 | * 5/2000 | Guhl et al. | 52/204.62 |

* cited by examiner

INTEGRATED MULTIPANE WINDOW UNIT AND SASH ASSEMBLY AND METHOD FOR MANUFACTURING THE SAME

RELATED APPLICATIONS

The present invention is a continuation in part of a U.S. Utility patent application, Ser. No. 08/935,924 filed on Sep. 23, 1997, now abandoned, which claims priority from provisional application no. 60/032,776 filed on Dec. 5, 1996.

BACKGROUND OF THE INVENTION

1. Field of the Invention

The present invention relates generally to commercial and architectural windows and, more particularly, to an integrated multipane window unit and sash assembly and a method for manufacturing the same.

2. Description of the Related Art

As is currently well-known in the art, insulating glass units, or IG units, are currently widely used as elements of windows and doors. Such units are used in windows and doors to reduce heat loss from building interiors in winter, and reduce heat gain into air-conditioned buildings in summer. The insulating glass units are typically formed separate from the sash, and then in a separate step the insulating glass unit is installed in a sash.

IG units generally consist of two parallel sheets of glass which are spaced apart from each other and which have the space between the panes sealed along the peripheries of the panes to enclose an air space between them. Spacer bars are placed along the periphery of the space between the two panes. The spacers are assembled into generally rectangular-shaped frames either by bending or by the use of corner keys.

As has evolved in the present commercially successful technology, insulating glass units form only the internal components of a sash element used in a window unit. A sash element forms the working element of the window, and forms a perimeter called a sash frame that holds necessary working hardware to allow the sash element to slide, locks, crank, et cetera.

Although many materials of construction are conventionally utilized for manufacturing of sash elements, such as wood and aluminum, presently available insulating window units that utilize a sash element formed of extruded polyvinyl chloride polymers are known to provide a superior insulating effect in conventional commercial and residential applications.

In the manufacture of conventional sash, one starts with extrusion called a "PVC" profile. These extrusions can be purchased from an extrusion manufacturer designed to make a style having a certain aesthetic. Extrusions can be made generally available to the marketplace; however, a general practice that has developed is to provide a partial exclusivity by region, market, etc. in order to allow a particular window manufacturer to associate a certain aesthetic with that manufacturer's product. Therefore, although many extrusion profiles are of an original design, they are treated in the marketplace as a quasi-commodity.

Another aspect of the extrusion profile is that given that the exterior surface must mate with the main frame, the profile is also functional as well as aesthetic. In order to accomplish this functionality, changes are made in internal grooves, channels, etc.

The next element in the manufacture of a sash is to cut corner miters in the sash element. These cuts are made in an oversized manner, by ¼ to ⅛ inch. This additional material is to allow for a process called vinyl welding, in which both seams are heated to a point wherein the PVC material softens and the joint is pressed together and cooled in place to form a cohesive bond. This process forms a corner joint that is stronger than the original extrusion.

The manufacture of the sash results in a four-sided sash frame. However, a flash buildup or 'swath' is formed by the vinyl welding process, which must be milled, cut, scraped, or otherwise removed. This process is called corner cleaning, and is generally accomplished by a separate piece of manufacturing equipment called a corner cleaner.

At this point the sash frame is now ready for glazing. Glazing is typically accomplished by one of two processes. The first readily used process is when an adhesive strip called a glazing tape is attached to a structure on the profile called the glazing leg. Next, an IG unit is adhered to the other side of the glazing tape, and glazing stops are then placed over the IG unit in order to hold the exterior of the IG unit. This process has advantages, in that the equipment and technology to accomplish this is skewed toward the glazing strip manufacturer, and the window manufacturer can form the window with less equipment and capital outlays. However, the drawbacks to this method lie in the increased cost of and limited materials that can be formed into glazing tapes.

The alternative method of glazing is by a process called back-bedding sealing. In this method, a sash frame is placed horizontally on an X-Y back-bedding machine that will lay down a continuous bead of fluid back bedding sealant along the glazing leg. The IG unit is then adhered to the back bedding, and glazing stops are attached. In this method, the back bedding material creates a seal between IG unit and the sash frame. Although additional equipment is required, this process allows the use of a variety of materials, including silicone adhesives, that have advantageous price and/or performance characteristics.

In all cases, IG units must necessarily be manufactured separately, and many times are made by separate company. The trend is to move this step in-house to control costs, size, availability, etc. Also, by controlling more directly the IG unit manufacture, both markets, retrofit (custom) and standard sizes (new installation) can be addressed.

The manufacturing of conventional IG units, as utilized in the manufacture of PVC insulating windows, has been thoroughly addressed within the art, and is meant to be incorporated herein. For purposes of identifying structures and for providing a frame of reference for the present invention, this manufacture shall be briefly discussed. First, a spacer bar is formed, generally of a hollow, roll-formed flat metal, into a hollow channel. Generally, a desiccant material is placed within the hollow channel, and some provisions are made for the desiccant to come into fluid communication with or otherwise affect the interior space of the IG unit. The spacer bar is then notched in order to allow it to be formed into a rectangular frame. Due to the nature and geometry of this frame, the IG unit at this point has very little structural rigidity. At this point a sealant is applied to the outer three sides of the spacer bar in order to bond a pair of glass panes to either opposite side of the spacer bar. Generally in use for this sealant is a polyurethane or polysulfide sealant, due to their combination of strength and moisture barrier characteristics. After application of the glass panes and curing of the sealant, the IG unit finally has structural integrity. The current state of the art is represented by U.S. Pat. No. 5,313,761, issued in the name of Leopold, in which hot melt butyl is directly applied to a spacer element that incorporates a folding corner key. Such a method is embodied in a very difficult and clumsy manufacturing process that incorporates a number of inherent manufacturing problems, one of which is the sealant must set under high heat and pressure, and then set for 1–2 days before curing completely.

A number of other problems exist with the current state of the art in IG unit performance. The use of polyurethane or polysulfide sealants, because of their non-pliable nature when cured, can cause stress fractures of the glass after periods of thermal cycling that cause expansion and contraction of the elements. This leads to fog or moisture intrusion into the interior air space. The use of polyisobutelene sealants have been attempted due to their excellent moisture barrier properties. However, poor structural integrity results. And, although silicone is a strong sealant material, it is porous to moisture intrusion and cannot be used by itself, and must be used as part of a double seal unit (dual seal).

Other recent issues have arisen that have yet to be addressed by the art, and can be characterized by a standard called the "warm edge test". The warm edge test is a thermal conductivity test that rates the insulating properties the IG unit, and is a method of quantifying the insulating capacity of an assembled insulating window, and not just of the component parts. The driving force for this characterization is governmental regulations that require structures have to have certain outside thermal envelope characteristics. However, because of the metal spacer necessary and the inevitable increase in thermal conductance caused by such a structure, conventional IG units perform poorly in this regard. This is mainly due to the fact that conventional IG units were designed to provide insulating properties along the viewable glass area and not increase insulating properties along the perimeter sash and frame areas.

The current state of the art for this technology is also represented by U.S. Pat. No. 5,313,761, issued in the name of Leopold, in which "U" shaped spacers without corner keys are used such that conduits for conductive heat transfer is cut in half. Also, the elimination of corner keys eliminates a natural leak point in the system.

Consequently, a need has therefore been felt for an improved but less complex mechanism that provides a thermally sealed and structurally sealed air pocket formed on two sides by a glass panel for use in otherwise conventional functioning windows.

SUMMARY OF THE INVENTION

It has been found that the qualities of well performing thermal air space are the allowing for glass to expand and contract without stress on the glass to a point where stress fractures would occur; or, to allow sealant to deform to a point where it fails to maintain structural integrity.

Further, it has been found that stresses between glass and sealant will inevitably take place, and that therefore the design of sash must allow such stress and movement to occur in a manner that diminishes the full load of such forces on glass and sealant.

Further, it has been found that the contact of the IG unit with the sash causes the sash to function as a radiator of heat, and consequently, a transmitter of vibration and therefore sound as well.

Further still, it has been found that the expansion coefficient of glass is less than that of the extrusion; therefore, any assembly must always keep any glass from making direct contact with the extrusion vinyl.

Therefore, it is an object of the invention to indicate a device of the type disclosed above which avoids the disadvantages inherent in the state of the art.

It is therefore an object of the present invention to provide an improved integrated multipane window unit and sash assembly.

It is another object of the present invention to provide an improved method for manufacturing such a multipane window unit.

It is a feature of the present invention to provide an integrated multipane window unit and sash assembly that forms both a thermally sealed and structurally sealed air pocket formed on two sides by a glass panel, and around its periphery by an internal glazing leg.

It is another feature of the present invention to provide an integrated multipane window unit and sash assembly that allows for glass to expand and contract without stresses that result in failure on either the glass or the sealant.

It is another feature of the present invention to provide an integrated multipane window unit and sash assembly that allows for any glass to rest above any extrusion shelf structure, thereby eliminating any stress against the edge of the glass that could cause cracking and providing for water drainage away from the sealant, thereby lessening the opportunity for the sealant to come into contact with water.

It is another feature of the present invention to provide an integrated multipane window unit and sash assembly that allow includes an offset section in the sash profile that is downward sloping to assist in evacuation of moisture.

It is another feature of the present invention to provide an integrated multipane window unit and sash assembly that allows for the use of a glazing clip in a manner that holds glass in place temporarily while allowing the sealant to cure during the manufacturing process.

It is another feature of the present invention to provide an integrated multipane window unit and sash assembly that utilizes a sealant for both adhesive purposes as well as to form a vapor barrier.

It is another feature of the present invention to provide an integrated multipane window unit and sash assembly that allows the glass elements to "float" on sealant between extrusion, thereby preventing direct contact of glass to vinyl.

It is another feature of the present invention to provide an integrated multipane window unit and sash assembly that allows desiccant to be truly isolated from any exterior source, thereby preventing the loading of the desiccant with moisture.

It is another feature of the present invention to provide an integrated multipane window unit and sash assembly that provides added sound deadening characteristics.

It is another feature of the present invention to provide an integrated multipane window unit and sash assembly that allows for the elimination of separately manufactured and installed conventional type IG units.

It is another feature of the present invention to provide a process for manufacturing such an integrated multipane window unit and sash assembly.

Briefly described according to one embodiment of the present invention, an integrated multipane window unit and sash combination is disclosed having a sash frame that incorporates an integral spacing structure formed integrally with the sash frame and protruding into the viewing opening. The integral spacing structure incorporates at least two vertical internal glazing surfaces upon which adhesive is affixed. In this configuration, the portions of sealant connecting each pane to the sash element are isolated from each other, thereby allowing each piece of glass to function separately.

An advantage of the present apparatus can be readily seen from the present disclosure; however, they can be summarized in the providing of both a superior performing multi-pane window unit, and an improved method of manufacturing the same.

These advantages can be capsulized by the unexpected results obtained in conventional thermal cycling "hot box" tests in which typical IG unit fails due to stress in about 12 weeks, but a unit made in accordance with the present teachings can exceed 25 weeks without failures.

Briefly described according to one method of manufacturing such an embodiment of the present invention, the use of an integrated multipane window unit and sash combination having integral spacing structure formed integrally with the sash frame and protruding into the viewing opening allows for an efficient manufacturing process in which the sash can be formed initially in an otherwise conventional manner. Subsequent to the initial forming of a structurally rigid sash member, sealant, either of a structural type, vapor barrier type, a combined type, or both types, can be applied directly to the vertical internal glazing surfaces of the finished sash frame. Next, because the internal glazing surfaces and spacing structure protrude into the viewing opening, the glass panes can then be affixed to the sealant. At this point a glazing clip can be affixed in a manner that holds the glass in place temporarily while allowing the sealant to cure during the manufacturing process.

Advantages of the present method can be readily seen from the present disclosure; however, they can be summarized in the providing of such a window unit in a manner that is less capital intensive and requires fewer manufacturing steps, equipment and personnel than what is required to manufacture windows using exiting IG units.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Apparatus

Figure 1:
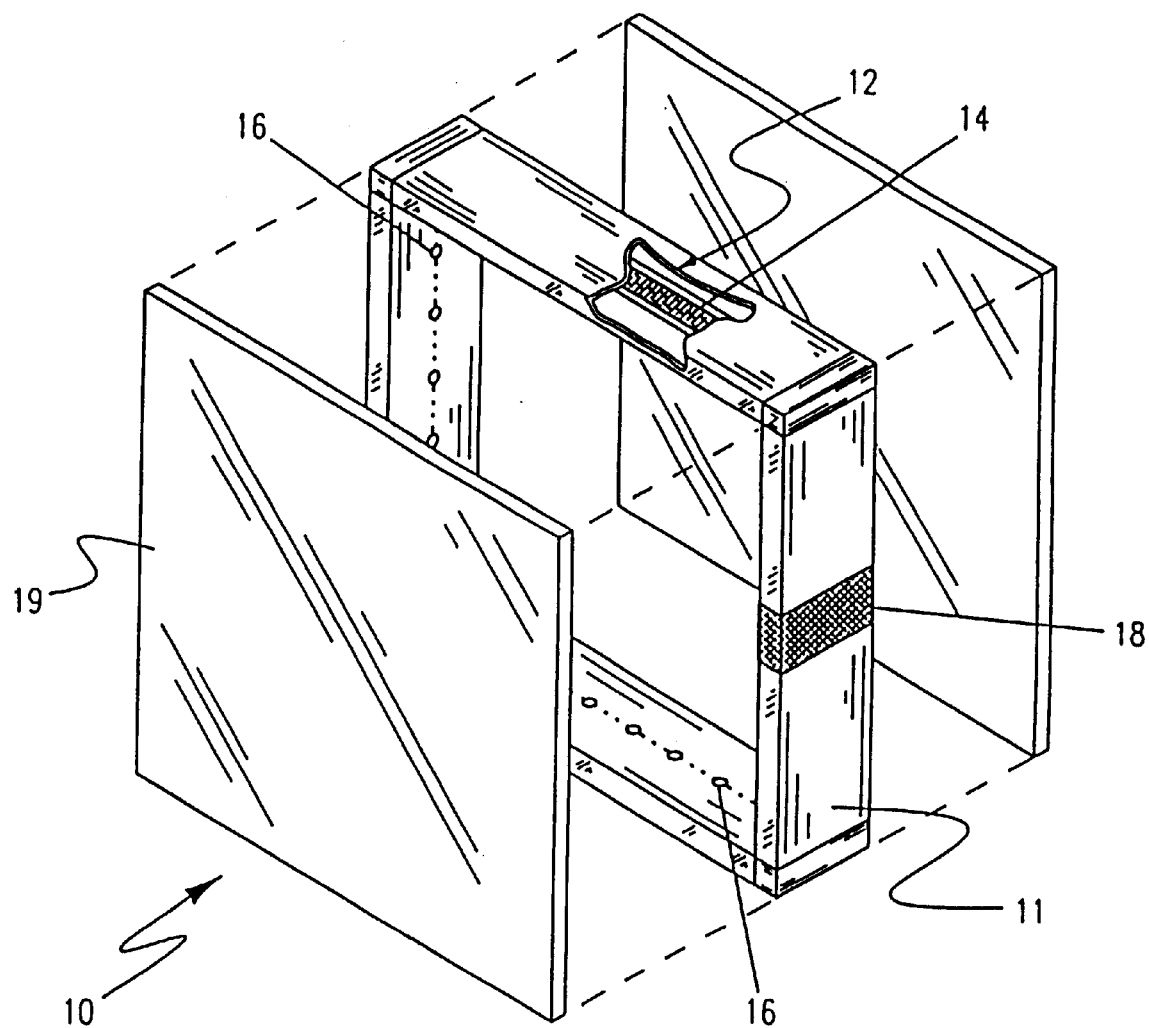
FIG. 1 is an exploded perspective view of a window sash frame according to the prior art.

Referring now to FIG. 1, a conventional IG unit, 10 as utilized in the manufacture of PVC insulating windows, is shown. A spacer bar 11, formed generally of a hollow, roll-formed flat metal, forms a hollow channel 12. A desiccant material 14 is placed within the hollow channel 12, and fluid conduits 16 are provided for the desiccant to come into fluid communication with or otherwise affect the interior space of the IG unit 10. Sealant 18 is applied to the outer three sides of the spacer bar 11 in order to bond a pair of glass panes 19 to either opposite side of the spacer bar 11.

Figure 2:
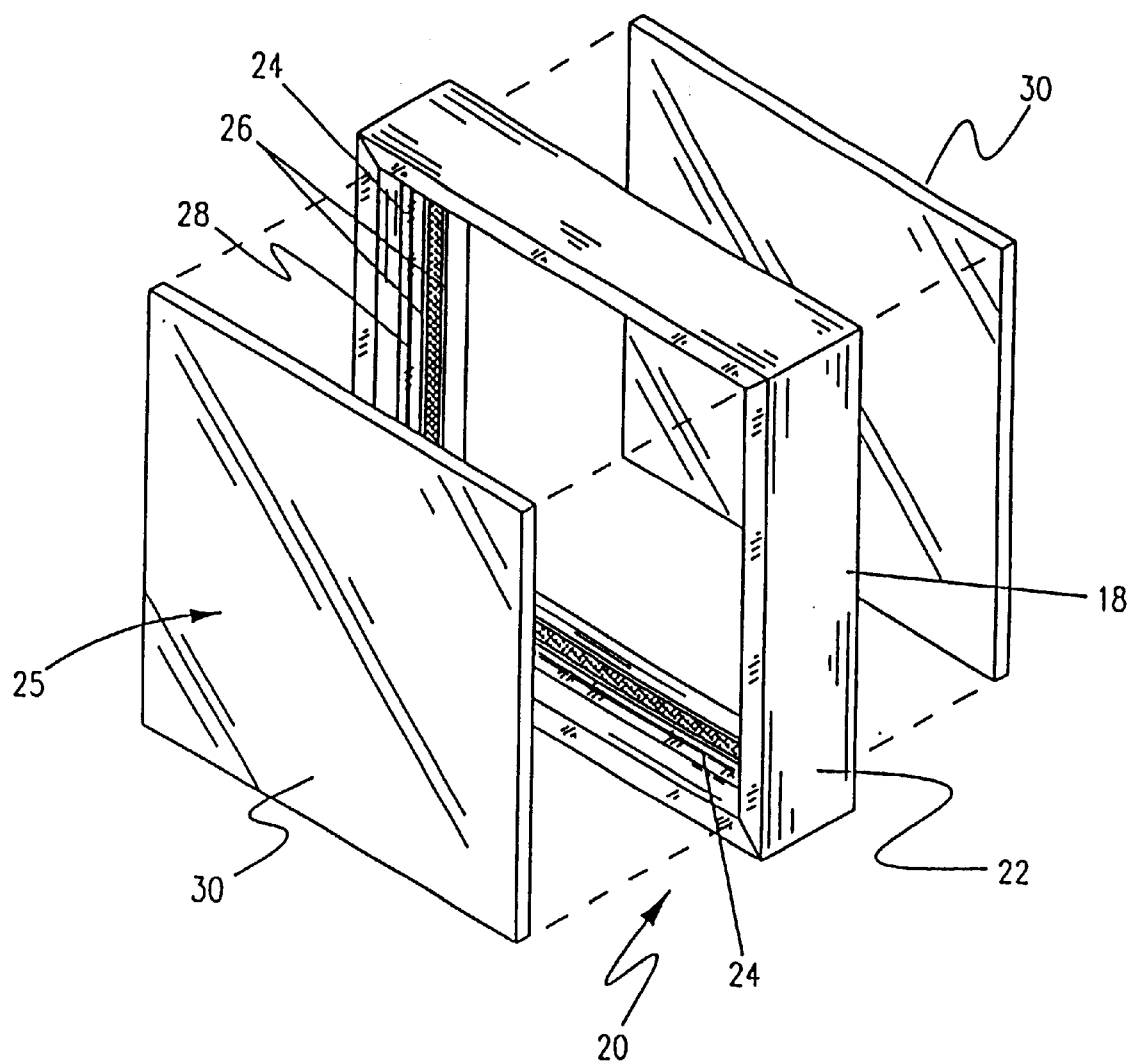
FIG. 2 is an exploded perspective view of a window sash frame according to a first preferred embodiment of an integrated multipane window unit and sash assembly according to the present invention.

Referring to FIG. 2, an integrated multipane window unit and sash combination 20 is disclosed having a sash frame 22 that incorporates an integral spacing structure 24 formed integral with the sash frame and protruding into the viewing opening (generally, 25). The integral spacing structure 24 incorporates at least two vertical internal glazing surfaces 26 upon which adhesive, or sealant 28 is affixed. Sealant 28 connecting each glass pane 30 to the integral spacing structure 24 is isolated from each other, thereby allowing each piece of glass 30 to function independently.

It has been found that the qualities of well performing thermal air space are the allowing for glass to expand and contract without stress on glass to point where stress fracture would occur; or to allow sealant to deform to point where fails to maintain structural integrity. Since stresses between glass and sealant will inevitably take place, the present invention allows for the stresses of the glass 30 to act directly upon the sash element via the vertical glazing surface through the sealant, and NOT to the opposing pane of glass, thereby allowing such stress and movement to occur in a manner that diminishes the full load of such forces on glass and sealant. This is done by providing the integrated spacing structure that allow the glass elements to "float" on sealant between extrusion, thereby preventing direct contact of glass to vinyl.

Figure 3A:
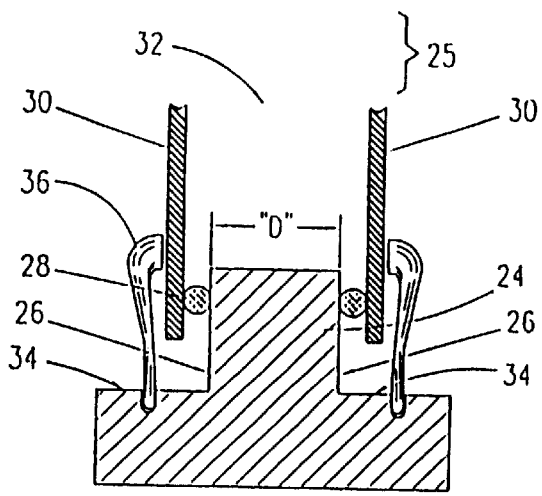
FIG. 3a is a partial cross sectional view of a sash frame element according to a first configuration of the present invention.

Further detail is shown in FIG. 3a. As described, the sash frame 22 incorporates directly an integral spacing structure 24. The integral spacing structure 24 is formed integral with the sash frame. The sash frame 22 itself is formed in a rigid, structural manner, and provide all the necessary or required structural rigidity of the completed sash frame. Unlike with conventional windows, there is no rigid IG unit that inevitable must function to provide a certain amount of structural rigidity to the system. The function of the integral spacing structure 24 is two-fold: first, to provide a separation space, "D", between glass panes 30 in order to form an insulating air space 32; second, to provide a pair of glazing surfaces, shown as internal glazing surfaces 26, upon which to mount each glass pane 30.

Each PVC profile that forms a sash frame element 22 must also include an inner sash frame surface 34. The integral spacing structure 24 must extend inward, above the level of the inner sash frame surface 34 and protruding into the viewing opening (generally, 25). The integral spacing structure 24 incorporates at least two vertical internal glazing surfaces 26 upon which adhesive, or sealant 28 is affixed. Sealant 28 connecting each glass pane 30 to the integral spacing structure 24 is isolated from each other. This protrusion allows for a number of manufacturing benefits, which are described below, as well as allowing the sash frame 22 itself to be formed and designed to provide all the necessary structural rigidity that is required by the completed sash assembly. Only with the sash frame 24 completed and having the internal glazing surfaces 26 being accessible above the inner sash frame surface 34, the glazing panes 30 can be accessed and fitted onto the finish sash frame 24. Otherwise, the sash frame would be required to be built onto the glass pane 30, resulting in the glass pane 30 being required to provide the structural integrity during the manufacturing process. Although such an embodiment is envisioned, and may exhibit some of the benefits anticipated by the present disclosure, such an embodiment is not considered to incorporate the best mode of the present disclosure.

Finally, a bead of sealant 28 is shown affixed to both the internal glazing surface 26 as well as the glass pane 30. Since the expansion coefficient of glass is less than that of a PVC extrusion, such a sealant configuration prevents the glass 30 from making direct contact with the extrusion vinyl. This minimum contact between glass 30 and space 24 avoids the disadvantages inherent in the state of the art, yet forms both a thermally sealed and structurally sealed air pocket formed on two sides by a glass panel, and around its periphery. Further, it is anticipated that the dimensions of the glazing pane 30 would be overall less than that of the inner sash frame surface 34, thereby allowing for the glass to expand and contract without stresses that result in failure on either the glass or the sealant. Further still, any glass rests above this extrusion shelf structure, thereby eliminating any stress against the edge of the glass that could cause cracking, as well as providing for water drainage away from the sealant, thereby lessening the opportunity for the sealant to come into contact with water.

Also envisioned is the otherwise conventional use of glazing clips 36, for providing an aesthetic visual barrier to the glazing elements of the unit. Further, glazing clip 36 can also be used in a manner such as to hold the glass 30 in place temporarily while allowing the sealant 28 to cure during the manufacturing process.

Figure 3B:
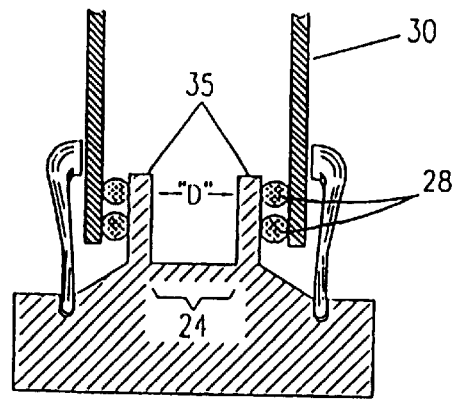
FIG. 3b a partial cross sectional view of a sash frame element according to a second configuration of the present invention.

FIG. 3b shows a second preferred embodiment of the present invention utilizing an integral spacing structure 24 that further provides a separation space, "D", between a pair of parallel, vertically spaced internal glazing legs 35. Each glazing leg 35 provides a glazing surface upon which to mount each glass pane 30. Further, each glazing leg allows for independent glass to expand and contract without stresses that result in failure on either the glass or the sealant and diminishes the full load of such forces on glass and sealant. This allows for each pane of glass to expand and contract independently without stresses that result in failure on either the glass or the sealant. Also, such a configuration provides added sound deadening characteristics in that the minimal possible surface area is shared between glass and spacer.

Finally, FIG. 3b shows a configuration wherein multiple beads of sealant 28 are shown affixed to both the internal glazing surface 26 as well as the glass pane 30. Such multiple beads would allow for the use of separate structural adhesive and vapor barrier sealants.

Figure 3C:
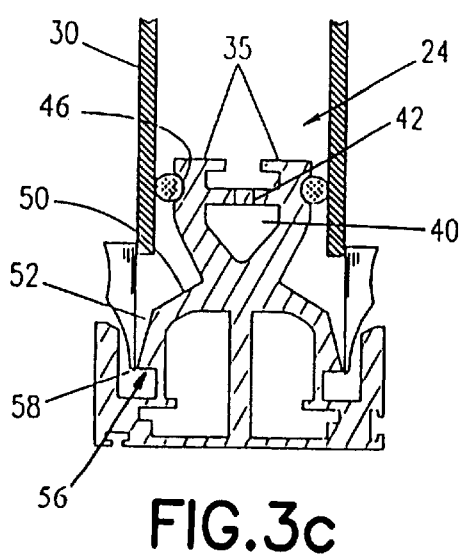
FIG. 3c is a partial cross sectional view of a sash frame element according to a third configuration of the present invention.

FIG. 3c shows a third preferred embodiment of the present invention, and depicts the current best mode of the present invention utilizing an integral spacing structure 24 that further provides a separation space and a plurality of internal cavities and external feature surfaces. A pair of parallel, vertically spaced internal glazing legs 35 further form a desiccant receiving cavity 40. In this manner, desiccant (not shown), as well as desiccant of an otherwise conventional type can be incorporated into such a receiving cavity 40 and provided with air conduits 42 which provide fluid communication between the receiving cavity 42 and the internal, thermally sealed air space formed between the glazing panels 30. Each glazing leg 35 provides a glazing surface upon which to mount each glass pane 30, as well as provides for lateral flexibility for receiving stresses communicated by the glass panes 30 as they expand and contract.

Also shown formed within the sash frame profile are a plurality, in this case two, internal frame cavities. In addition to manufacturing convenience, such cavities provide increased structural rigidity to the assembly sash frame. Further, it is envisioned that many such cavity designs can be incorporated to provide for various structural needs, as well as to receive other materials, such as desiccant, insulative material, or the like.

An additional feature disclosed in FIG. 3c is a sealant receiving recess 46, shown as a trough or notch recess below the outermost surface of the external glazing surface of each internal glazing leg. Such a structure allows for increased surface area contact between sealant and glazing surface, increased volume availability for sealant material, as well as easier manufacturing in the applying of sealant to the glazing surface.

Finally, a number of additional features are disclosed in the best mode embodiment shown in FIG. 3c. These include: an internal offset surface 50, for accommodating the thickness of the glass pane 30; an internal drainage slope 52 formed as a downwardly sloping surface along the top of the internal offset surface 50 for aiding in the drainage of moisture into a moisture collection channel 56; and, a glazing clip retaining channel 58 that provides for the dual functionality of retaining a glazing clip by frictional impingement as well as providing a drainage conduit for accumulated moisture.

Figure 3D:
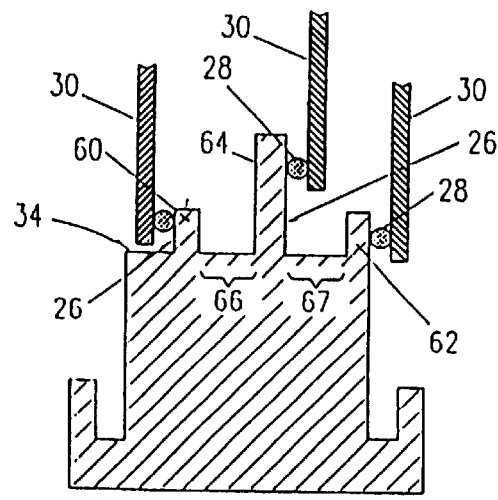
FIG. 3d a partial cross sectional view of a sash frame element according to a fourth configuration of the present invention.

As shown in FIG. 3d, an alternate embodiment of the present invention is provided depicting the capability of triple glazing. Such an embodiment is depicted simply in order to communicate the essence of the teachings of the present invention. In such an embodiment, a sash frame is provided having a first internal glazing leg 60 formed integrally with the sash frame. The sash frame itself is formed in a rigid, structural manner, and provides all the necessary or required structural rigidity of the completed sash frame. A second internal glazing leg 62 is further formed integrally with the sash frame, and in a similar manner as and parallel to said first internal glazing leg. Additionally, a third internal glazing leg 64 is provided, located in the space formed between the first internal glazing leg and the second internal glazing leg. In this manner, a first separation space 66, between the first internal glazing leg and the third internal glazing leg, and a second separation space 67 between the second internal glazing leg and the third internal glazing leg, are formed. Each glazing leg incorporates a glazing surface upon which to mount a glass pane 30. Each internal glazing leg must extend inward, above the level of the inner sash frame surface 34 and protruding into the viewing opening (generally, 25). In keeping with the manufacturing methods taught hereinbelow wherein the sash frame is fully assembled prior to glazing, it would be necessary for the third internal glazing leg to extend inward, above the level of one of the other internal glazing legs, and is shown herein as extending inward above the level of the second internal glazing leg. In this manner, the triple glazing integral spacing structure allows for three vertical internal glazing surfaces 26 upon which adhesive, or sealant 28 can be affixed and can thereby form a triple pane insulating unit.

Other adaptations of the present teachings can be envisioned. For purposes of examples, and not by way of limitation, several variations are described herein:

1. In a two-internal glazing leg configuration, providing one glazing leg extending upward above the other in a manner that allows the user to affix glazing panes to both surfaces, thereby allowing for an alternate triple glazing configuration;
2. Incorporate muntin retaining clips or receiving notches 72 within the sash profile, and more particularly, within the separation space formed in the integral spacing structure formed of the vertically spaced internal glazing legs;
3. The use of a desiccant sealant material that provides conventional structural and vapor barrier characteristics along with desiccant properties, made possible in a configuration that allows the internal cavity to have contact with the internal surface of the sealant;
4. The use of traditional IG units in place of single glass glazing panes, thereby allowing the combined benefits of the two technologies; and
5. Incorporation of tempered, stained, plate, bullet proof, or other specialty glasses that could not otherwise be subject to the heat and pressures necessary for curing of traditional IG units as glazing panes, thereby allowing for the expanded use of insulating glass windows into a variety of areas where such use is currently unavailable.

Figure 4A:
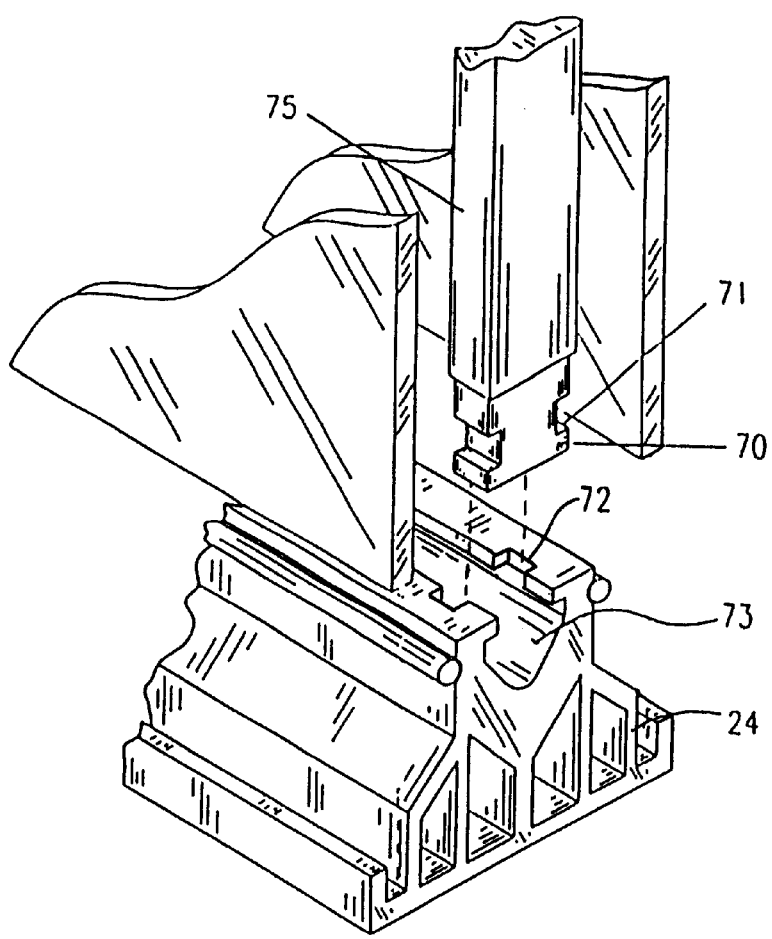
FIG. 4a is a partial exploded perspective of a muntin assembly connection shown in combination with the present invention.
Figure 4B:
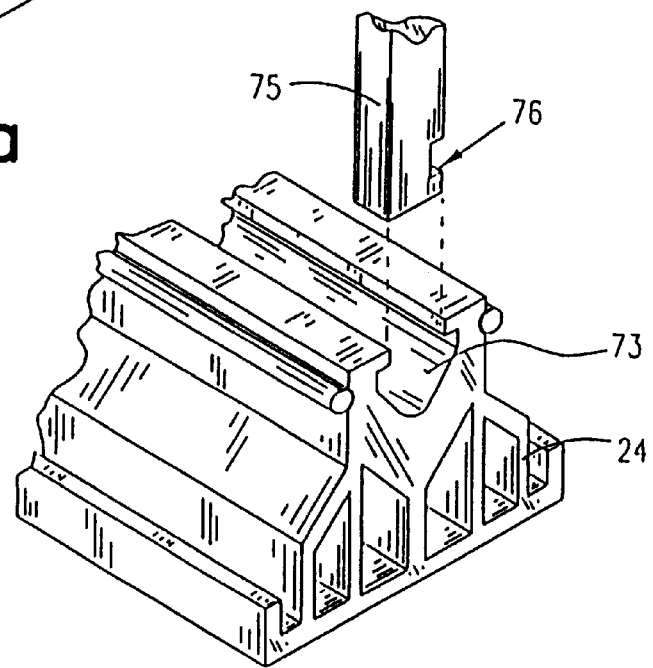
FIG. 4b is a partial exploded perspective of an alternate design for a muntin assembly connection shown in combination with the present invention.

Additional benefits of the designs generated by the present invention, in all its variations, embodiments, and improvements, include the ability to include muntin bars between the sealed insulating space and affixed directly to the sash frame. As best shown in FIG. 4a it, is envisioned that a separate muntin retaining clip 70, having a frame affixment point 71, shown as an otherwise conventional friction fit, snap lock fastener element that is received within a clip receiving slot 73 formed by and within the sash frame member 24. In this configuration, it is envisioned that a muntin grid comprising hollow type grid members can thereby receive the opposite end of the clip 70. Use of a plurality of such clips 70 would result in the muntin assembly being retained within the insulative space and yet affixed directly to the sash frame. By way of merely one further example of many possible, and not meant in limitation, as shown in FIG. 4b. a muntin grid element 75 can incorporate a sash frame receiving notch 76 directly within the grid element. Such a configuration can then be received and retained directly by a clip receiving slot 73 formed by and within the sash frame member 24. Use of a plurality of such notches and slots would again result in the muntin assembly being retained within the insulative space and yet affixed directly to the sash frame.

Figure 5:
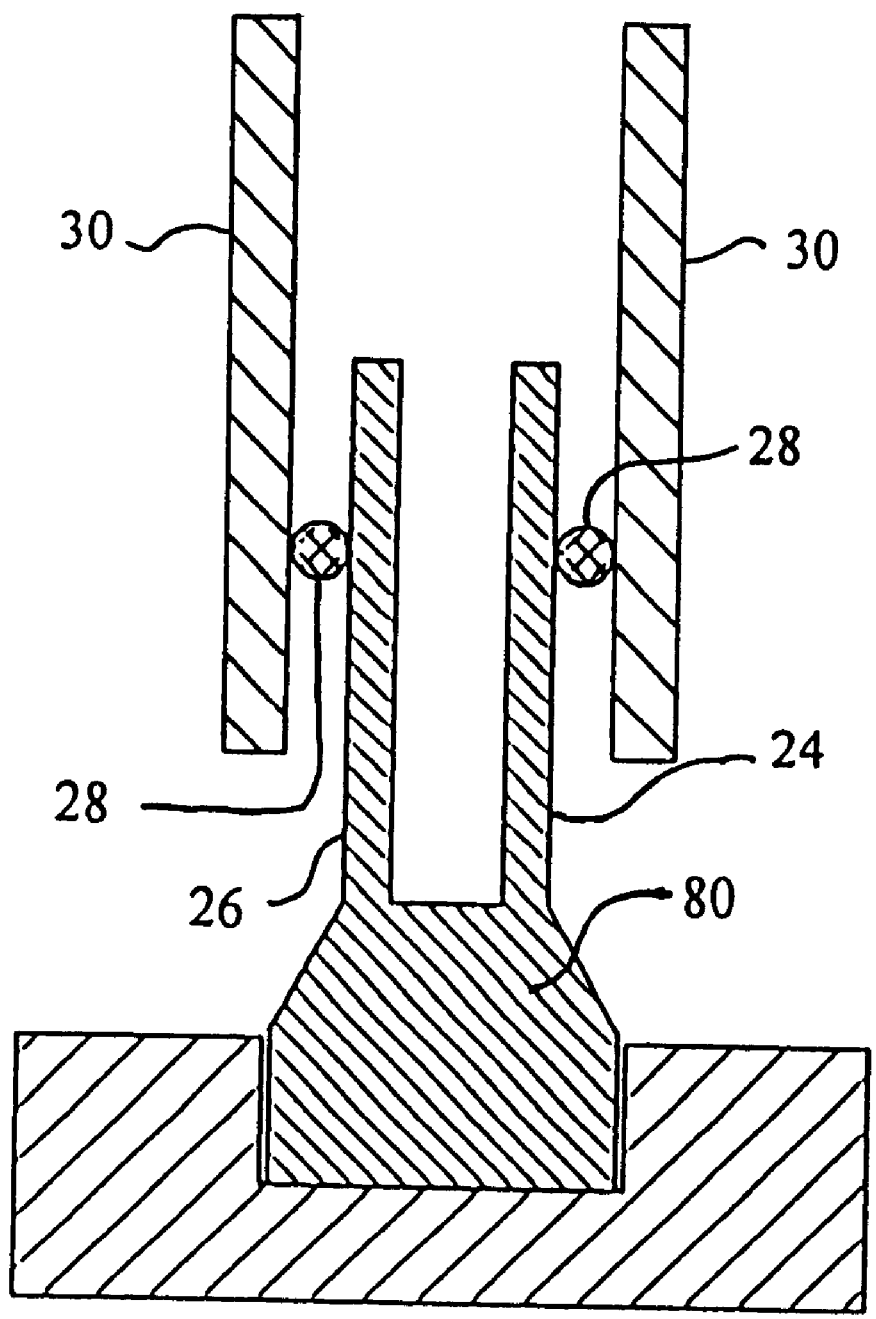
FIG. 5 is a partial cross sectional view of a sash frame element according incorporating the teachings of the present invention for use with a wood-frame window sash.

One final example of the utilization of the teachings of the present disclosure is further shown in FIG. 5, wherein the technology taught and described is adapted for use in the manufacture of windows made with wood, aluminum, or other sash material. Such a configuration is made possible by use of an internal glazing insert 80, formed in a manner similar as anticipated above with the sash frame, except made in a manner to be incorporated or inserted into a conventional wood or aluminum window in a manner that would otherwise be done with a conventional IG unit. As such, an integrated multipane window insert 80 is disclosed having an insert frame that incorporates an integral spacing structure 24 formed integrally with the insert frame and protruding into the viewing opening. The integral spacing structure 24 incorporates at least two vertical internal glazing surfaces 26 upon which adhesive, or sealant 28 is affixed. Sealant 28 connecting each glass pane 30 to the integral spacing structure 24 is isolated from each other, thereby allowing each piece of glass 30 to function independently. In this manner, the qualities of well performing thermal air space are achieved while allowing the glass to expand and contract without stress on the glass to the point where stress fracture would occur. This structure also prevents the sealant from deforming to a point where it fails to maintain structural integrity, and can be added to an otherwise conventional wood or aluminum sash frame. In this manner, stresses between the glass and sealant, which will inevitably take place, will be transferred to the PVC insert, rather than against the wood or aluminum sash frame. ps 2. Detailed Description of the Method of Producing the Apparatus In addition to the functional and performance advantages resulting from the features of an apparatus configured according to the present disclosure, numerous improvements to the manufacturing process can also result. As such, the manufacture of an integrated multipane window unit and sash combination, having an integral spacing structure formed integrally with the sash frame and protruding into the viewing opening, allows for an efficient manufacturing process in which the sash can be formed initially in an otherwise conventional manner. Subsequent to the initial forming of a structurally rigid sash member, sealant, either of a structural type, vapor barrier type, a combined type, or both types, can be applied directly to the vertical internal glazing surfaces of the finished sash frame. Next, because the internal glazing surfaces and spacing structure protrude into the viewing opening, the glass panes can then be affixed to the sealant. At this point a glazing clip can be affixed in a manner that holds glass in place temporarily while allowing the sealant to cure during the manufacturing process.

Advantages of the present method can be readily seen from the present disclosure; however, they can be summarized in the providing of such a window unit in a manner that is less capital intensive and requires fewer manufacturing steps, equipment and personnel than what is required to manufacture windows using exiting IG units.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A multipane window unit comprising:
   a window sash that provides a structural frame having an inside perimeter;
   a glazing pane spacing and mounting structure comprising at least two spaced, parallel glazing legs formed integrally with and extending from a main structural portion of said window sash, said spaced legs terminating in ends that define a viewing perimeter smaller than said inside perimeter to provide a viewing opening for said window unit, said ends being independent of one another and unconnected along substantially the entire viewing perimeter of said structural frame to preclude the transfer of stresses therebetween;
   a first glazing pane having edges defining a perimeter that is greater than said viewing perimeter and less than the inside perimeter of said structural frame, said first glazing pane being adhesively mounted to float on one of said glazing legs such that the glazing pane edges are unconstrained along substantially the entire first glazing pane perimeter; and a second glazing pane having edges defining a perimeter that is greater than said viewing perimeter and less than the inside perimeter of said structural frame, said second glazing pane being adhesively mounted to float on the other of said glazing legs such that the glazing pane edges are unconstrained along substantially the entire second glazing pane perimeter;

said spacing and mounting structure maintaining planar window surfaces of said first and second glazing panes substantially parallel to each other with a fixed space therebetween, such that the glazing panes are isolated from one another and function independently with respect to stresses.

2. A multipane window unit in accordance with claim 1 wherein said glazing panes float on their respective glazing legs without directly contacting any portion of the glazing legs.

3. A multipane window unit in accordance with claim 2 wherein said glazing planes do not directly contact any portion of said sash.

4. A multipane window unit in accordance with claim 1 wherein said spacing and mounting structure extends from said main structural portion of said window sash toward said viewing opening.

5. A multipane window unit in accordance with claim 1 wherein the integral window sash and spacing and mounting structure are formed from aluminum.

6. A multipane window unit in accordance with claim 1 wherein the integral window sash and spacing and mounting structure are formed from a polymer.

7. A multipane window in accordance with claim 6 wherein said polymer comprises polyvinylchloride.

8. A multipane window unit in accordance with claim 1 wherein the adhesive mounting is provided by a sealant comprising at least one of a heat curable platinum catalyzed silicone rubber, polyurethane, polysulfide, or a hot melt adhesive.

9. A multipane window unit in accordance with claim 1 wherein the adhesive mounting is provided by an acrylic-functional isobutylene polymer.

10. A multipane window unit in accordance with claim 1 wherein at least one of an absorbent and adsorbent material is positioned within said fixed space.

11. A multipane window unit in accordance with claim 1 wherein at least one of an absorbent and adsorbent material is positioned within a cavity of an extrusion forming said sash and communicates with said fixed space.

12. A multipane window unit in accordance with claim 1 wherein said spacing and mounting structure includes a trough communicating with said fixed space, said trough containing said at least one of an absorbent and adsorbent material.

13. A multipane window unit in accordance with claim 1 further comprising a muntin bar simulating assembly positioned within said fixed space.

14. A multipane window unit in accordance with claim 13 wherein said muntin bar simulating assembly is affixed to said spacing and mounting structure.

15. A multipane window unit in accordance with claim 14 wherein said muntin bar simulating assembly has notches at ends thereof which are adapted to engage with corresponding rails at the ends of said glazing legs.

16. A multipane window unit in accordance with claim 15 wherein said rails have notches to receive the ends of the muntin bar simulating assembly.

17. A multipane window unit comprising:

a window sash that provides a structural frame having an inside perimeter;

a glazing pane spacing and mounting structure formed integrally with and extending from a main structural portion of said window sash, said glazing pane spacing and mounting structure defining a viewing perimeter smaller than said inside perimeter to provide a viewing opening for said window unit;

a first glazing pane having edges defining a perimeter that is greater than said viewing perimeter and less than the inside perimeter of said structural frame, said first glazing pane being adhesively mounted to float on a first side of said glazing pane spacing and mounting structure such that the glazing pane edges are unconstrained along substantially the entire first glazing pane perimeter; and a second glazing pane having edges defining a perimeter that is greater than said viewing perimeter and less than the inside perimeter of said structural frame, said second glazing pane being adhesively mounted to float on a second side of said glazing pane spacing and mounting structure such that the glazing pane edges are unconstrained along substantially the entire second glazing pane perimeter;

said spacing and mounting structure maintaining planar window surfaces of said first and second glazing panes substantially parallel to each other with a fixed space therebetween, such that the glazing panes are isolated from one another and function independently with respect to stresses.

18. A multipane window unit in accordance with claim 17, wherein said glazing pane spacing and mounting structure comprises at least two spaced, parallel glazing legs formed integrally with and extending from said main structural portion of said window sash, said spaced legs terminating in ends that define said viewing perimeter, said ends being independent of one another.

19. A multipane window unit in accordance with claim 18, wherein said first glazing pane is adhesively mounted to float on one of said glazing legs, and the second glazing pane is adhesively mounted to float on the other of said glazing legs.

20. A multipane window unit comprising:

a window sash that provides a structural frame having an inside perimeter;

a glazing pane spacing and mounting structure comprising at least two spaced, parallel glazing legs formed integrally with and extending from a main structural portion of said window sash, said spaced legs terminating in ends that define a viewing perimeter smaller than said inside perimeter to provide a viewing opening for said window unit, said ends being independent of one another and unconnected along substantially the entire viewing perimeter of said structural frame to preclude the transfer of stresses therebetween;

a first glazing pane having edges defining a perimeter that is greater than said viewing perimeter and less than the inside perimeter of said structural frame, said first glazing pane being adhesively mounted to float on one of said glazing legs; and a second glazing pane having edges defining a perimeter that is greater than said viewing perimeter and less than the inside perimeter of said structural frame, said second glazing pane being adhesively mounted to float on the other of said glazing legs;

said spacing and mounting structure maintaining planar window surfaces of said first and second glazing panes substantially parallel to each other with a fixed space therebetween, such that the glazing panes are isolated from one another and function independently with respect to stresses.

* * * * *

UNITED STATES PATENT AND TRADEMARK OFFICE
CERTIFICATE OF CORRECTION

PATENT NO.     : 6,286,288 B1                                              Page 1 of 1
DATED          : September 11, 2001
INVENTOR(S)    : France It is certified that error appears in the above-identified patent and that said Letters Patent is hereby corrected as shown below:

<u>Title page,</u>
Item [56], References Cited, add the following three references:

Under U.S. PATENT DOCUMENTS add:
-- 4,791,762     12/1988         Hwang --

Under FOREIGN PATENT DOCUMENTS add:
-- 340607     10/1959     (CH) --
-- 378513     7/1964      (CH) --

Signed and Sealed this

Second Day of July, 2002

Attest:

Attesting Officer

JAMES E. ROGAN
Director of the United States Patent and Trademark Office